United States Patent
Masuda

(10) Patent No.: US 8,199,228 B2
(45) Date of Patent: Jun. 12, 2012

(54) METHOD OF AND APPARATUS FOR CORRECTING CONTOUR OF GRAYSCALE IMAGE

(75) Inventor: Tomonori Masuda, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 909 days.

(21) Appl. No.: 12/071,651

(22) Filed: Feb. 25, 2008

(65) Prior Publication Data
US 2008/0204579 A1   Aug. 28, 2008

(30) Foreign Application Priority Data
Feb. 26, 2007   (JP) ................... 2007-045674

(51) Int. Cl.
- H04N 5/202 (2006.01)
- H04N 5/225 (2006.01)
- H04N 5/232 (2006.01)
- H04N 5/208 (2006.01)

(52) U.S. Cl. .............. 348/254; 348/349; 348/222.1; 348/252

(58) Field of Classification Search .......... 348/348, 348/349, 222.1, 252
See application file for complete search history.

(56) References Cited

U.S. PATENT DOCUMENTS
2004/0190752 A1 * 9/2004 Higaki et al. ............ 382/103

FOREIGN PATENT DOCUMENTS
| JP | 2006-46959 | 2/2006 |
| JP | 2006-153773 | 6/2006 |

* cited by examiner

Primary Examiner — Jason Chan
Assistant Examiner — Joel Fosselman
(74) Attorney, Agent, or Firm — McGinn IP Law Group, PLLC

(57) ABSTRACT

A grayscale image with corrected contours, which is suitably applicable to the art of recognition of objects, is obtained using a grayscale image and a distance image of a subject. The contour of the grayscale image where a grayscale contour image extracted from the grayscale image and a distance contour image extracted from the distance image agree with each other in contour, is corrected to generate the grayscale image with corrected contours. It is possible to highlight or emphasize the boundary of the subject, and a contour correcting process, which is different from the ordinary contour correcting process, can be carried out on a boundary of the subject.

40 Claims, 16 Drawing Sheets

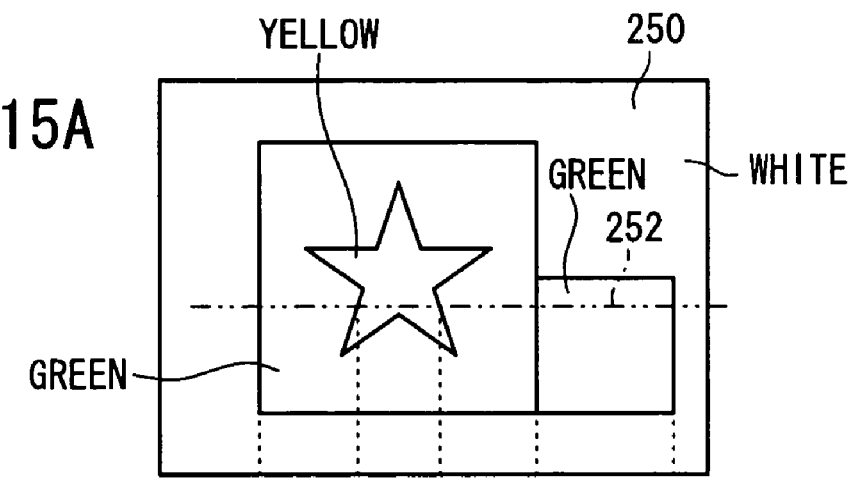
FIG. 15A
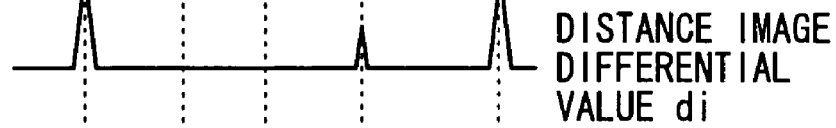
FIG. 15B — GRAYSCALE IMAGE DIFFERENTIAL VALUE dj
FIG. 15C — DISTANCE IMAGE DIFFERENTIAL VALUE di
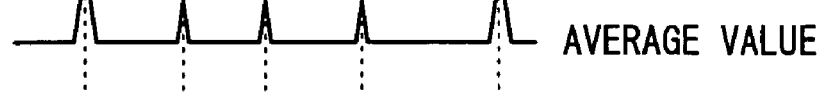
FIG. 15D — AVERAGE VALUE
FIG. 15E
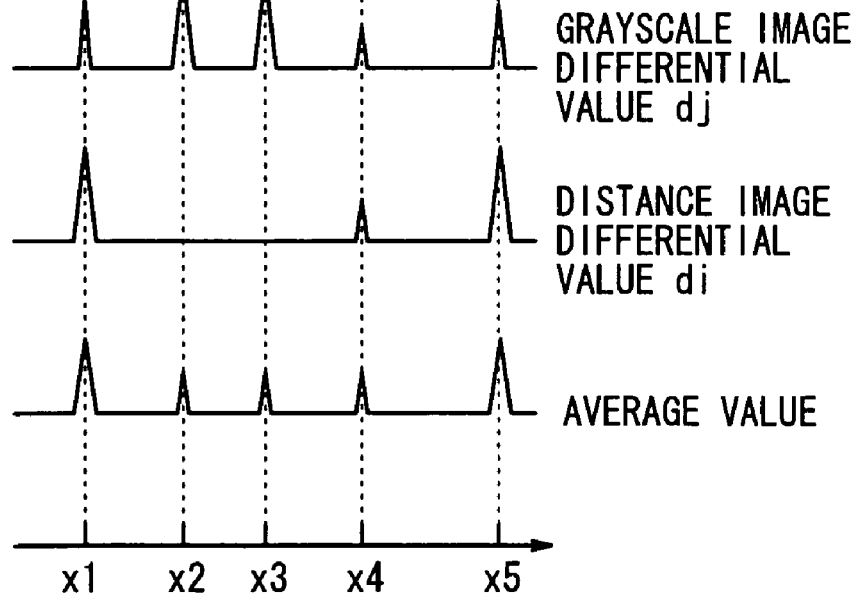

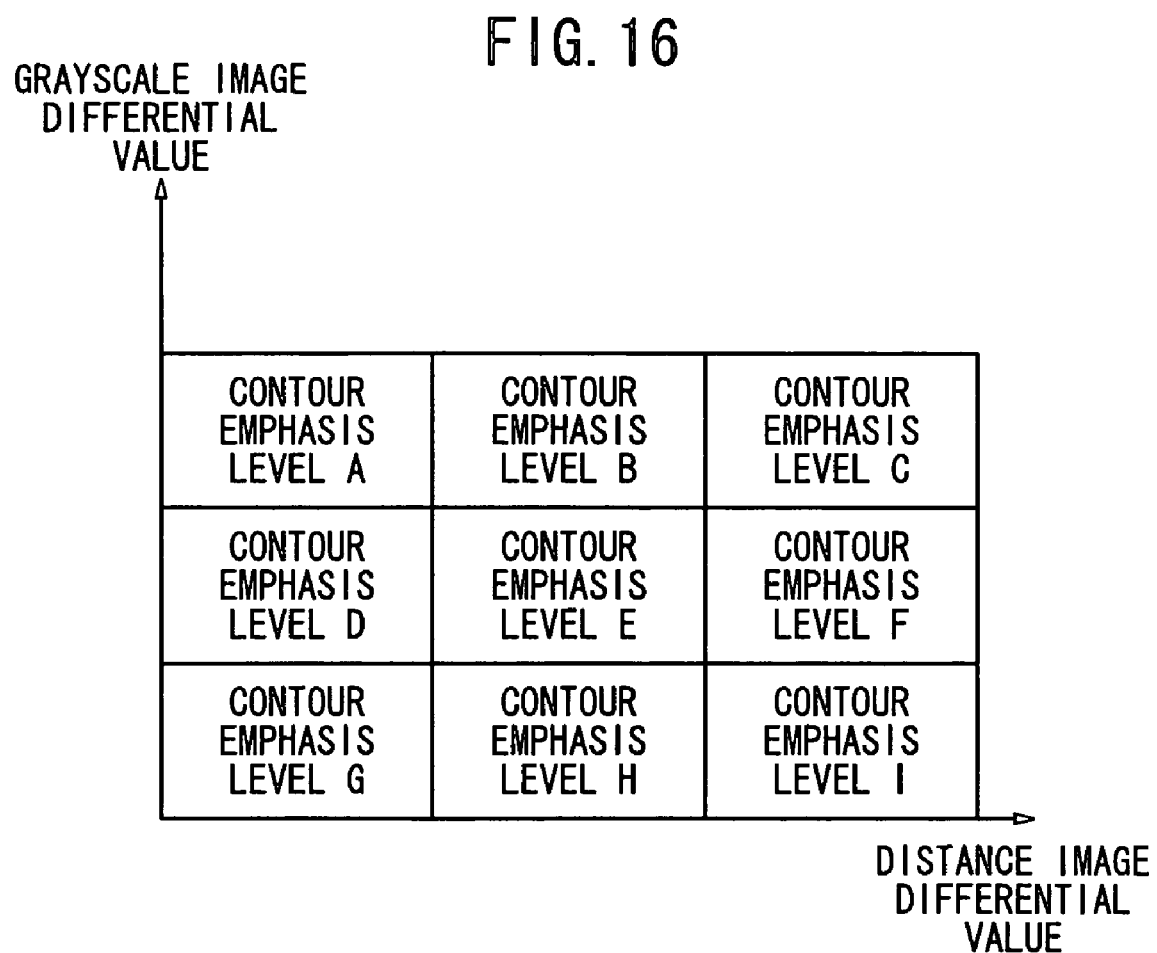

METHOD OF AND APPARATUS FOR CORRECTING CONTOUR OF GRAYSCALE IMAGE

BACKGROUND OF THE INVENTION

1. Field of the Invention

The present invention relates to a method of and an apparatus for correcting the contour of a grayscale image, and more particularly to a method of and an apparatus for correcting the contour of a grayscale image of a subject which is generated by an image capturing device, based on the information of a distance image of the subject.

2. Description of the Related Art

Heretofore, there has generally been known a grayscale image, whose gradation values are represented by pixel values, generated when a subject is imaged by an image capturing device such as a digital camera, a video camera, or the like.

Distance image capturing apparatus have been proposed in recent years for capturing an image of an object space with an image capturing device and generating a distance image whose pixel value is represented by a distance value from the image capturing device to an object (subject) that is present in the object space (see Japanese Laid-Open Patent Publication No. 2006-153773 and Japanese Laid-Open Patent Publication No. 2006-046959).

A grayscale image correcting process has experimentally been carried out by obtaining a grayscale image and a distance image of a subject with an image capturing device and clipping and generating a grayscale image that exists in 2 m from the image capturing device based on the information of the distance image.

The process of correcting (processing) a grayscale image based on the information of a distance image is expected to be applied to a highly advanced security camera, a next-generation entering and leaving system sensor, a robot vision sensor, various FA sensors, etc.

A technology for extracting the contour of a distance image is disclosed in Japanese Laid-Open Patent Publication No. 2006-153773 referred to above. According to the disclosed technology, a moving body as an object and a background thereof are imaged a plurality of times to produce a distance image. In view of an overshooting caused around the distance image of the object, the distance image with the overshooting is smoothed, and a differential image between the smoothed distance image and the distance image with the overshooting is extracted as a contour.

Japanese Laid-Open Patent Publication No. 2006-046959 referred to above discloses an image capturing device comprising a light emission source for irradiating an object space with intensity-modulated light whose intensity changes periodically, a photodetector for capturing an image of the object space, the photodetector including an array of photosensitive elements for generating electric output signals depending on respective detected amounts of light, and an image generator for generating, from the detected amounts of light from the photosensitive elements, a distance image whose pixel values are represented by distance values by converting the phase difference of intensity-modulated light generated when the light radiated from the light emission source into the object space is reflected by an object in the object space and detected by the photosensitive elements, into a distance up to the object, and a grayscale image whose pixel values are represented by grayscale levels which represent the detected amounts of light from the photosensitive elements. The publication also discloses that a contour extractor extracts both a region in a differentiated grayscale image where the grayscale differential value is of a local maximum and a region in a differentiated distance image where the distance differential value is of a local maximum, as a contour of the object.

SUMMARY OF THE INVENTION

It is an object of the present invention to provide a method of and an apparatus for suitably correcting the contour of a grayscale image of a subject which is generated by an image capturing device, based on the information of a distance image of the subject.

According to the present invention, there is provided a method of correcting the contour of a grayscale image based on an image processing process carried out by a computer, comprising the steps of generating both a distance contour image representing a contour extracted from a distance image whose pixels include distance values and a grayscale contour image representing a contour extracted from a grayscale image whose pixels include gradation values, from a subject, determining whether or not there is a contour in regions on the distance contour image whose coordinate positions correspond to those of regions which include a portion of the contour of the grayscale contour image, and correcting the contour of the grayscale image if it is judged that there is the contour.

In the above method, the contour of the grayscale image where the grayscale contour image and the distance contour image agree on the contour with each other is corrected. It is possible to highlight or emphasize a boundary of the subject. A contour correcting process, which is different from the ordinary contour correcting process, can be carried out on the boundary of the subject. The contour correcting method according to the present invention is thus effectively applicable to the art of recognition of objects, for example.

According to the present invention, there is also provided a method of correcting the contour of a grayscale image based on an image processing process carried out by a computer, comprising the steps of capturing a distance image whose pixels include distance values and a grayscale image whose pixels include gradation values, from a subject, generating a grayscale contour image representing a contour extracted from the grayscale image, calculating differential values or distance value differences of regions on the distance image whose coordinate positions correspond to those of regions which include a portion of the contour of the grayscale contour image, and correcting the contour of the grayscale image depending on the calculated differential values or the calculated distance value differences of the regions on the distance image.

In the above method, the contour of the grayscale image is corrected depending on the differential values or the distance values of the regions on the distance image. Accordingly, appropriate information can be added to object boundaries, for example, and continuous information can be given. The contour correcting method according to the present invention is thus effectively applicable to the art of recognition of objects, for example.

The step of calculating the differential values or the distance value differences on the distance image comprises the step of calculating differential values or gradation value differences of regions on the grayscale image whose coordinate positions correspond to those of the regions which include a portion of the contour of the grayscale contour image; and the step of correcting the contour of the grayscale image comprises the step of correcting the contour of the grayscale image based on the calculated differential values or the calculated distance value differences of the regions on the distance image, and the calculated differential values or the calculated gradation value differences of the regions on the grayscale image.

The contour of the grayscale image is corrected based on the grayscale image differential values or the gradation value differences which have been calculated on the grayscale image and the distance image differential values or the distance value differences which have been calculated on the distance image. Consequently, boundary information of the object can be added in a natural fashion to the contour of the grayscale image. Since the information of the grayscale image remains unremoved, a natural three-dimensional effect of the grayscale image is achieved.

The regions used for correcting the contour of the grayscale image may be a single region on the distance contour image and a single region on the grayscale contour image.

The step of correcting the contour of the grayscale image comprises the step of changing the gradation value or color of pixels making up the contour.

The contour of the grayscale image can be corrected depending on the application of the present invention.

The above methods may be available as a program which can be read and executed by a computer.

In addition, the above methods may be available as a recording medium storing such a program.

Moreover, the above methods may be available as an apparatus executing the steps of the methods.

That is, according to the present invention, there is provided an apparatus for correcting the contour of a grayscale image, comprising a contour image generator for generating a distance contour image representing a contour extracted from a distance image whose pixels include distance values and a grayscale contour image representing a contour extracted from a grayscale image whose pixels include gradation values, from a subject, a contour existence/nonexistence determining unit for determining whether or not there is a contour in regions on the distance contour image whose coordinate positions correspond to those of regions which include a portion of the contour of the grayscale contour image, and a contour corrector for correcting the contour of the grayscale image if it is judged that there is the contour.

The apparatus of the present invention makes it possible to suitably correct the contour of the grayscale image of a subject captured by an image capturing device based on the contour information of the distance image of the subject.

According to the present invention, there is also provided an apparatus for correcting the contour of a grayscale image, comprising an image reader for capturing a distance image whose pixels include distance values and a grayscale image whose pixels include gradation values, from a subject, a grayscale contour image generator for generating a grayscale contour image representing a contour extracted from the grayscale image, a distance image differential value/distance value difference calculator for calculating differential values or distance value differences of regions on the distance image whose coordinate positions correspond to those of regions which include portions of the contour of the grayscale contour image, and a contour corrector for correcting the contour of the grayscale image depending on the calculated differential values or the calculated distance value differences of the regions on the distance image.

The apparatus further comprises a grayscale image differential value/gradation value difference calculator for calculating differential values or gradation value differences of regions of the grayscale image whose coordinate positions correspond to those of the regions which include a portion of the contour of the grayscale contour image, and the contour corrector corrects the contour of the grayscale image based on the calculated differential values or the calculated distance value differences of the regions on the distance image, and the calculated differential values or the calculated gradation value differences of the regions on the grayscale image.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 15A is a diagram showing a grayscale image, a grayscale contour image, and a distance image;

FIG. 15B is a diagram showing differential values of the grayscale image;

FIG. 15C is a diagram showing differential values of the distance image;

FIG. 15D is a diagram showing values produced by processing the differential values of the grayscale and distance images;

FIG. 15E is a diagram showing positions of the contours; and

FIG. 16 is a diagram illustrative of a process of correcting a contour based on distance differential values and grayscale differential values.

DESCRIPTION OF THE PREFERRED EMBODIMENTS

Preferred embodiments of the present invention will be described below with reference to the drawings.

Figure 2:
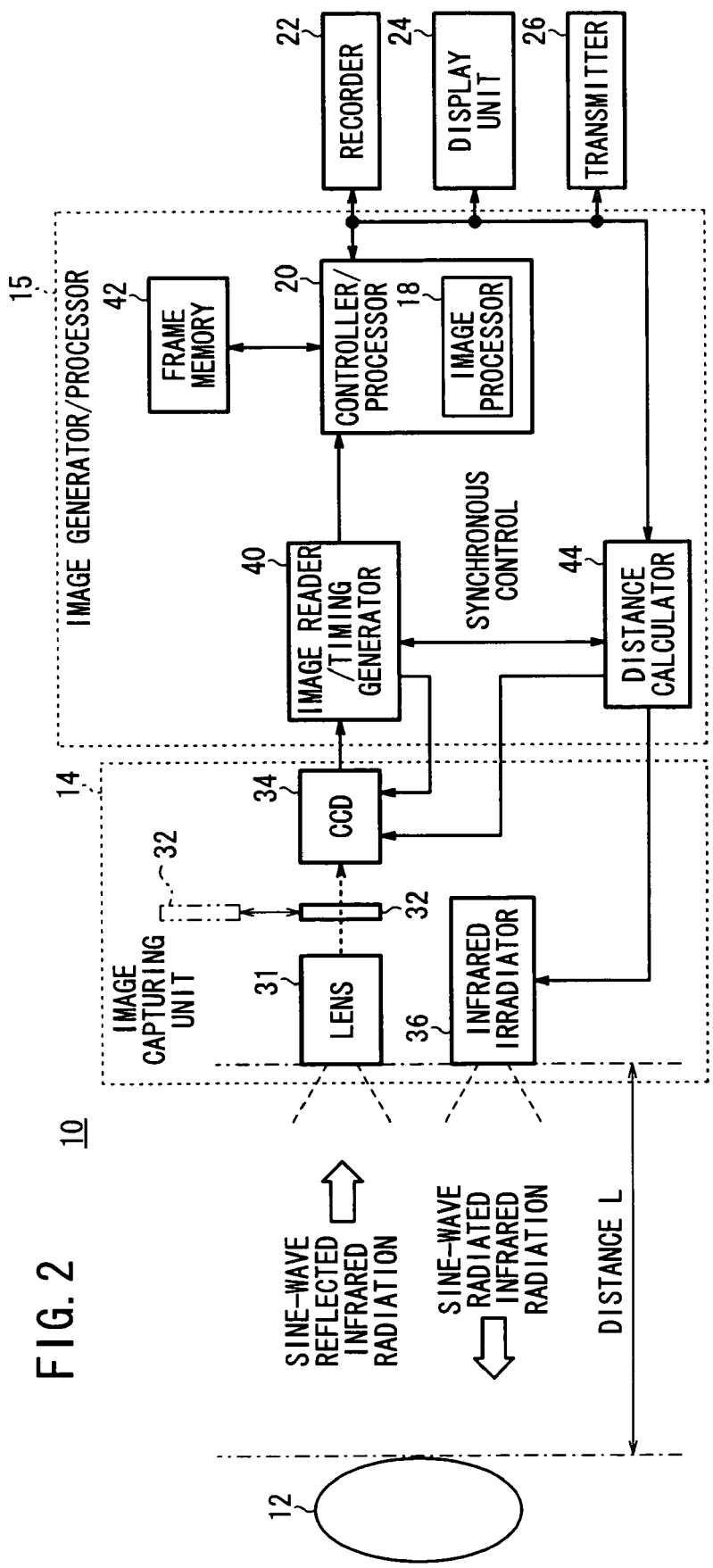
FIG. 2 is a block diagram showing a hardware arrangement of the distance image/grayscale image capturing system shown in FIG. 1.

FIG. 2 shows in block form a hardware arrangement of a distance image/grayscale image capturing system 10 to which a method of correcting the contour of a grayscale image according to an embodiment of the present invention is applied.

Figure 1:
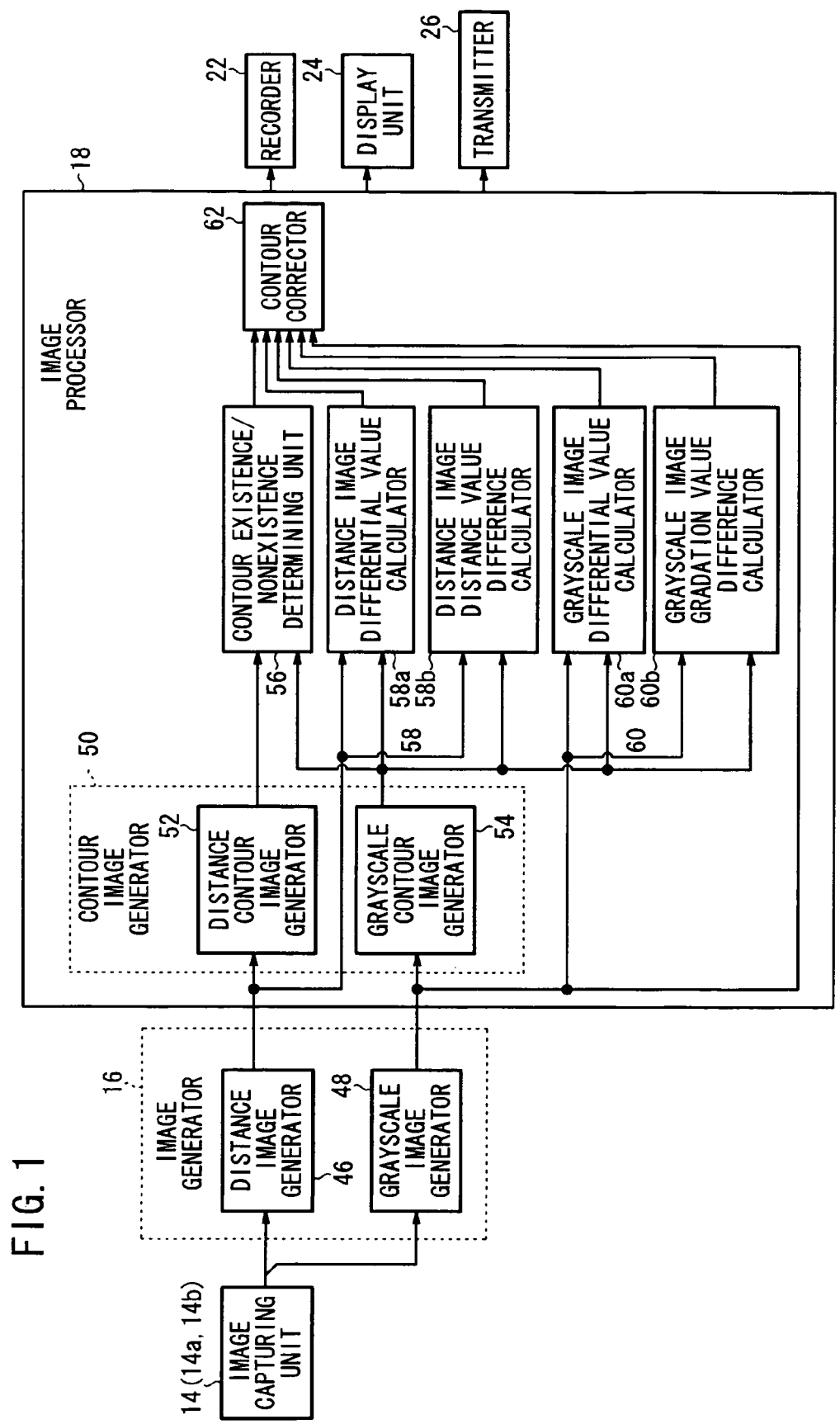
FIG. 1 is a block diagram of a major portion of a distance image/grayscale image capturing system to which a method of correcting the contour of a grayscale image according to an embodiment of the present invention is applied.

FIG. 1 shows in block form of a major portion of the distance image/grayscale image capturing system 10 shown in FIG. 2.

As shown in FIG. 1, the distance image/grayscale image capturing system 10 basically comprises an image capturing unit 14 functioning as a distance image capturing unit 14a for capturing a distance image of a subject 12 (see FIG. 2) and a grayscale image capturing unit 14b for capturing a grayscale image of the subject 12, an image generator 16 for generating a distance image and a grayscale image from image signals generated by the image capturing unit 14, an image processor 18 for performing various image processing processes including a contour correcting process based on attributes of the distance and contour images with respect to the grayscale image generated by the image generator 16, a recorder 22 for recording images generated by a controller/processor 20 (see FIG. 2) including the image processor 18, a display unit 24 for displaying the images, and a transmitter 26 for transmitting the images to an external circuit. The image generator 16 shown in FIG. 1 represents a function of an image generator/processor 15 shown in FIG. 2.

The image generator/processor 15 comprises a microcomputer, for example. The microcomputer comprises a CPU (Central Processing Unit), memories including a ROM (Read Only Memory) which may be an EEPROM and a RAM (Random Access Memory), input/output units including an A/D converter, a D/A converter, etc., and a timer as a timing means. When the CPU reads programs stored in the ROM and executes the programs, the CPU performs the functions of the controller/processor 20, the image processor 18, a distance calculator 44, an image reader/timing generator 40 (see FIG. 2), and the image generator 16 shown in FIG. 1.

As shown in FIG. 2, the image capturing unit 14 comprises a lens 31, an infrared passing filter 32, an interline CCD sensor 34, and an infrared light irradiator 36. When the infrared passing filter 32 is positioned on an optical axis between the lens 31 and the CCD sensor 34, the image capturing unit 14 functions as the distance image capturing unit 14a. When the infrared passing filter 32 is retracted out of the optical axis and placed in a position indicated by the two-dot-and-dash lines, the image capturing unit 14 functions as the grayscale image capturing unit 14b. The infrared light irradiator 36 also functions as a sine-wave generator, and irradiates the subject 12 with an infrared radiation that has been intensity-modulated with a sine wave having a frequency corresponding to a predetermined wavelength.

The image generator/processor 15 includes, in addition to the controller/processor 20, the image reader/timing generator 40 which has a CDS (Correlated Double Sampling) circuit and an A/D converter, a frame memory 42 for storing two image frames at a time, and the distance calculator 44 having a timing control and time measuring function and controllable in synchronism with the image reader/timing generator 40. The controller/processor 20 functions as a camera controller and a memory controller in addition to the image processor 18.

The distance image/grayscale image capturing system 10 shown in FIG. 2 generates a grayscale image at a rate of 30 fps (frames per second) as with the video camera. The distance image/grayscale image capturing system 10 also generates a distance image according to the TOF (Time Of Flight) process which determines a distance from the time of arrival of a sine-wave-modulated infrared irradiation emitted from the infrared light irradiator 36 and reflected from the subject 12.

When the distance image/grayscale image capturing system 10 shown in FIGS. 1 and 2 generates a grayscale image and a distance image, the distance image/grayscale image capturing system 10 may calculates a distance from a plurality of frames of a captured image signal produced by the CCD sensor 34. The CCD sensor 34 may have R, G, B pixels and also an array of pixels for generating a distance image, and the distance image/grayscale image capturing system 10 may calculate a distance from those pixels for generating a distance image.

Figure 3:
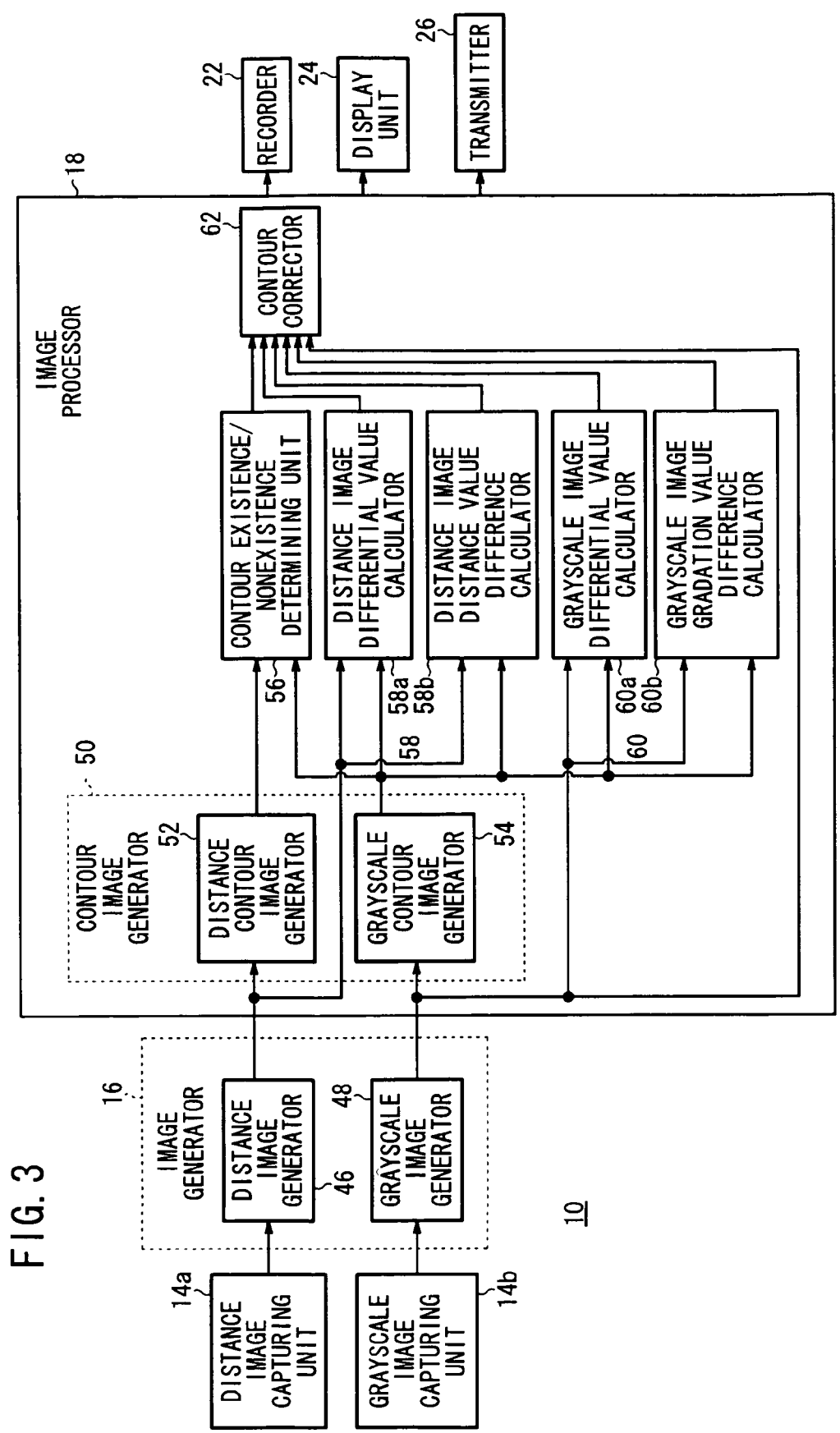
FIG. 3 is a block diagram showing a hardware arrangement of a distance image/grayscale image capturing system according to another embodiment of the present invention.

FIG. 3 shows in block form a hardware arrangement of a distance image/grayscale image capturing system 10 according to another embodiment of the present invention. As shown in FIG. 3, an image capturing unit 14 comprises two image capturing units, i.e., a distance image capturing unit 14a which includes a lens 31, an infrared light irradiator 36, an infrared passing filter 32, and a CCD sensor 34 and a grayscale image capturing unit 14b which includes a lens 31 and a CCD sensor 34.

As shown in FIG. 1, the image generator 16 comprises a distance image generator 46 and a grayscale image generator 48. The distance image generator 46 generates and outputs a distance image whose pixels representing the subject 12 and its background include distance values. The grayscale image generator 48 generates and outputs a grayscale image whose pixels representing the subject 12 and its background include gradation values.

The image processor 18 includes a contour image generator 50 which comprises a distance contour image generator 52 for generating and outputting a distance contour image representative of the contour of the distance image read from the distance image generator 46, and a grayscale contour image generator 54 for generating and outputting a grayscale contour image representative of the contour of the grayscale image read from the grayscale image generator 48.

The image processor 18 also includes a contour existence/nonexistence determining unit 56 for performing a process, to be described later, based on the distance contour image and the grayscale contour image which are generated by the contour image generator 50, a distance image differential value calculator 58a for calculating a differential value of the distance image by referring to the grayscale contour image generated by the grayscale contour image generator 54, a distance image differential value calculator 58a for calculating a differential value of the distance image and a distance image distance value difference calculator 58b for calculating a distance value difference of the distance image by referring to the grayscale contour image generated by the grayscale contour image generator 54, and a grayscale image differential value calculator 60a for calculating a differential value of the grayscale image and a grayscale image gradation value difference calculator 60b for calculating a gradation value difference of the grayscale image by referring to the grayscale contour image generated by the grayscale contour image generator 54.

The distance image differential value calculator 58a and the distance image distance value difference calculator 58b jointly make up a distance image differential value/distance value difference calculator 58. The grayscale image differential value calculator 60a and the grayscale image gradation value difference calculator 60b jointly make up a grayscale image differential value/gradation value difference calculator 60.

The image processor 18 further includes a contour corrector 62 for correcting the contour of the grayscale image read from the grayscale image generator 48 based on processed results from the contour existence/nonexistence determining unit 56, the distance image differential value/distance value difference calculator 58, and the grayscale image differential value/gradation value difference calculator 60.

The distance image/grayscale image capturing system 10 is basically constructed as described above. Operation of the image processor 18 will be described below with reference to a flowchart. The CPU of the image processor 18 reads a program representing the flowchart, and executes the read program.

Figure 4:
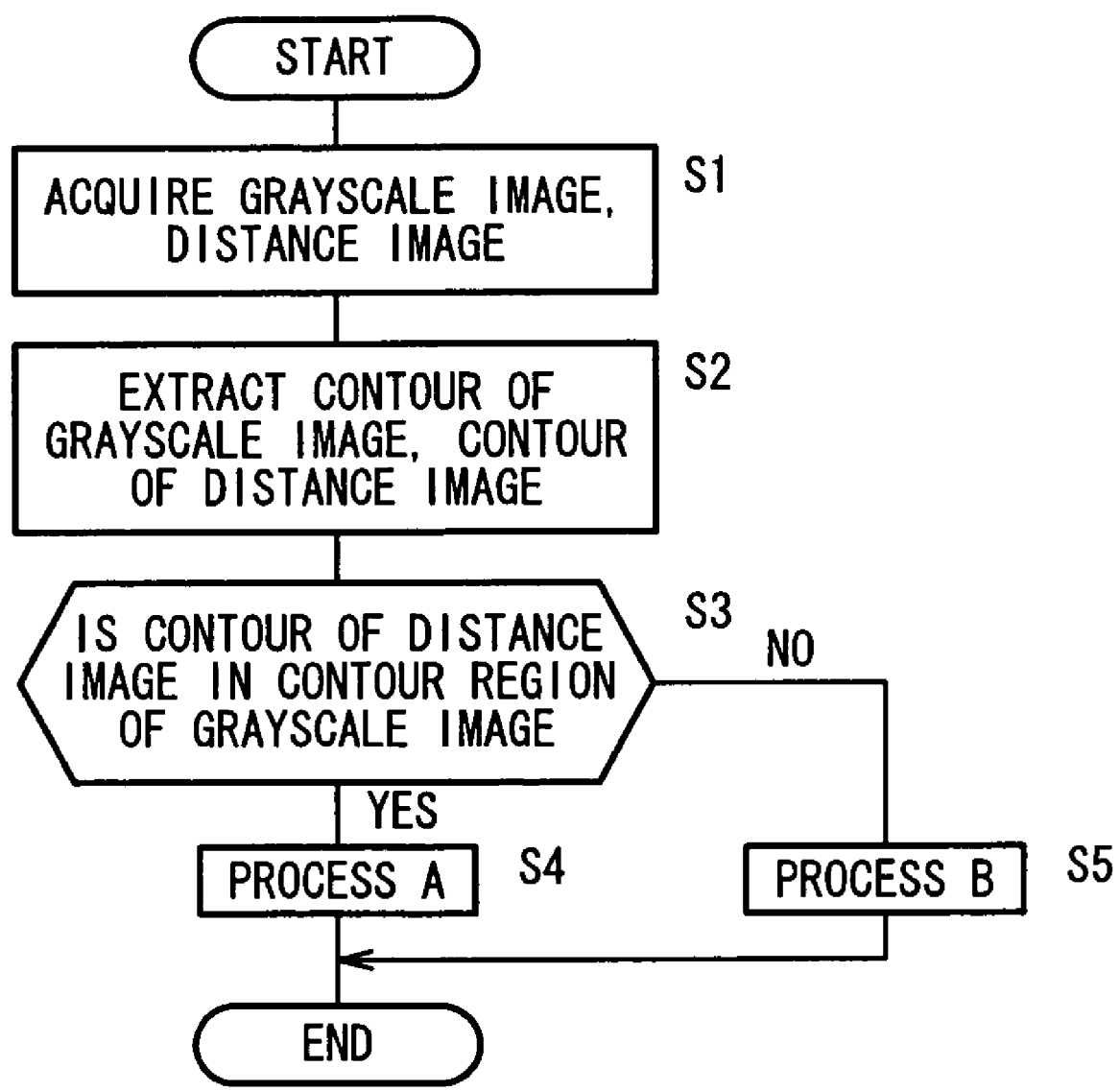
FIG. 4 is a flowchart of an operation sequence of a process according to a first exemplary embodiment of the present invention.

First exemplary embodiment (a process of determining whether a contour correcting process is to be carried out or not based on whether there is a contour of a distance image or not):

FIG. 4 is a flowchart of an operation sequence of a process according to a first exemplary embodiment of the present invention.

In step S1 shown in FIG. 4, the distance contour image generator 52 and the grayscale contour image generator 54 acquire a distance image of the subject 12 whose pixels include distance values through the distance image capturing unit 14a and the distance image generator 46 and a grayscale image of the subject 12 whose pixels include gradation values through the grayscale image capturing unit 14b and the grayscale image generator 48, respectively.

The grayscale image refers to an image generally produced by an image capturing unit such as a digital camera or the like and including a color image, a black-and-white image, a luminance image, etc. The pixel values of the grayscale image have respective gradation values. The distance image refers to an image representing a two-dimensional distribution of distances produced by a distance measuring method such as a TOF method. The pixels of the distance image have respective distance values.

Figure 5:
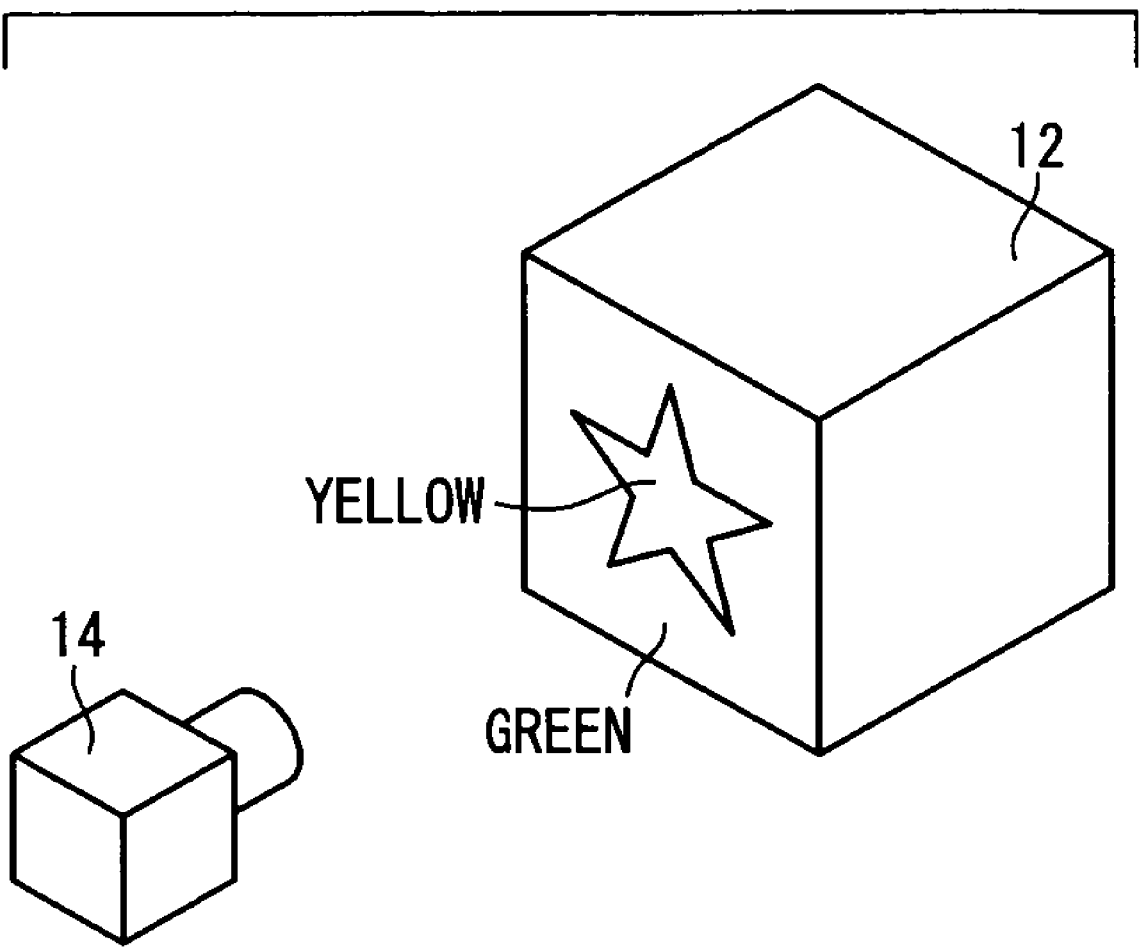
FIG. 5 is a view showing a subject to be imaged in the process according to the first exemplary embodiment.

As shown FIG. 5, the image capturing unit 14 (including both the distance image capturing unit 14a and the grayscale image capturing unit 14b) captures a grayscale image and a distance image of the subject 12 which faces the image capturing unit 14 head-on and which comprises a box in the form of a green rectangular parallelepiped with a yellow star-shaped pattern painted on its front facet. The subject 12 is placed against a white background.

Figure 6A:
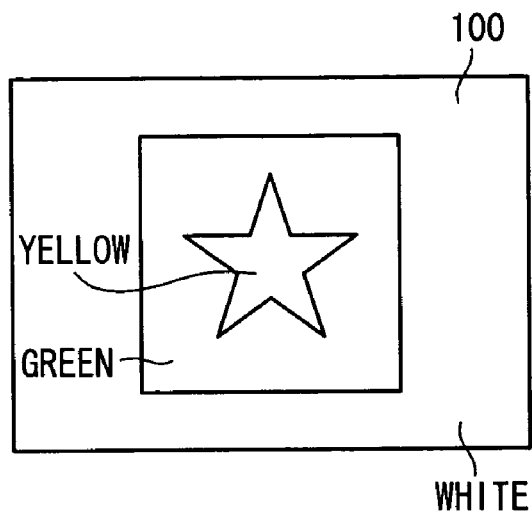
FIG. 6A is a diagram showing a grayscale image.

FIG. 6A shows an acquired grayscale image 100 of the subject 12. FIG. 6C shows an acquired distance image 102 of the subject 12. The distance image 102 does not include a star-shaped pattern which appears in the grayscale image 100 because the star-shaped pattern represents no distance difference. The distance image 102 is colored depending on the distance values. Specifically, the distance values of the facet on which the star-shaped pattern is drawn are colored in red, and the distance values of the background are colored in white.

Figure 6B:
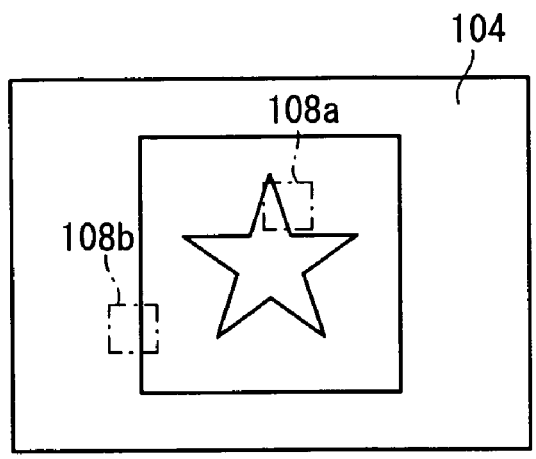
FIG. 6B is a diagram showing a grayscale contour image.
Figure 6C:
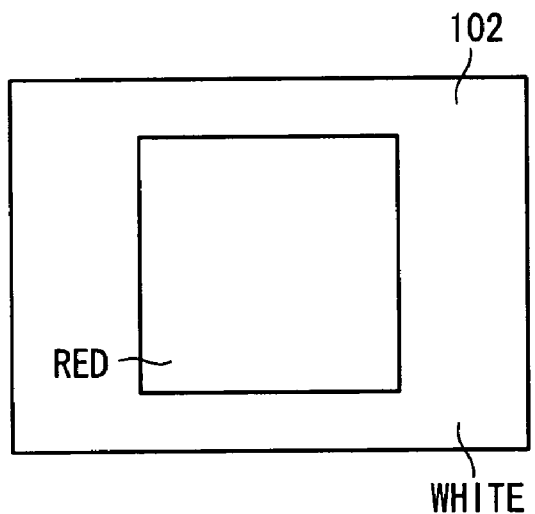
FIG. 6C is a diagram showing a distance image.

In step S2, the grayscale contour image generator 54 extracts a contour from the grayscale image 100 and generates a grayscale contour image 104 shown in FIG. 6B. The grayscale contour image generator 54 may generally extract a contour by calculating gradation value differences (pixel value differences), e.g., luminance differences or differential values, between pixels in question and a surrounding region, and determining values in excess of a threshold as a contour. In the grayscale contour image 104 shown in FIG. 6B, the rectangular shape representing the periphery of the box and the star shape are extracted as contours from the grayscale image 100 shown in FIG. 6A.

Figure 6D:
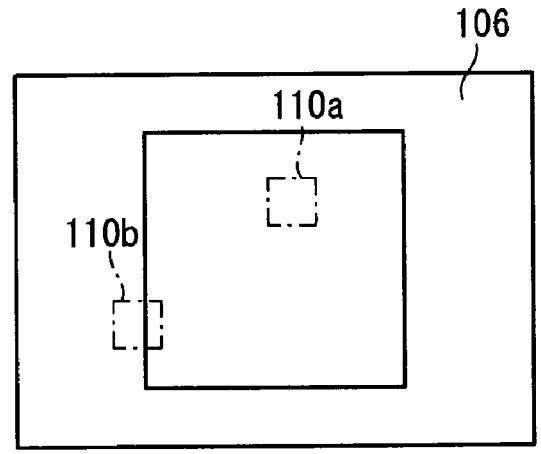
FIG. 6D is a diagram showing a distance contour image.

In step S2, the distance contour image generator 52 extracts a contour from the distance image 102 and generates a distance contour image 106 shown in FIG. 6D. The distance contour image generator 52 may generally extract a contour by calculating distance value differences (pixel value differences) or differential values between pixels in question and a surrounding region, and determining values in excess of a threshold as the contour. In the distance contour image 106 shown in FIG. 6D, the rectangular shape based on the distance value differences between the periphery of the box and the background are extracted as a contour from the distance image 102 shown in FIG. 6C.

In step S3, the contour existence/nonexistence determining unit 56 determines whether or not there is a contour in regions 110a, 110b on the distance contour image 106 whose coordinate positions correspond to those of contour-containing regions (hereinafter referred to as "contour regions") 108a, 108b which contain portions of the contour of the grayscale contour image 104. As can be seen from FIGS. 6B and 6D, there is no contour in the region 110a on the distance contour image 106 which corresponds to the region 108a on the grayscale contour image 104, and there is a contour in the region 110b on the distance contour image 106 which corresponds to the contour region 108b on the grayscale contour image 104. The contour existence/nonexistence determining unit 56 then determines (confirms) whether or not there is a contour in all contour regions, i.e., small regions whose size can freely be selected, on the grayscale contour image 104.

Depending on the determined result of step S3, the contour corrector 62 performs a contour correcting process on the grayscale image 100.

Specifically, with respect to the region 110b on the distance contour image 106 which corresponds to the contour region 108b on the grayscale contour image 104, since there is a contour in the region 110b, the answer to step S3 is affirmative, and the contour corrector 62 performs a process of emphasizing the contour of the grayscale image 100 (hereinafter referred to as "process A"). With respect to the region 110a on the distance contour image 106 which corresponds to the contour region 108a on the grayscale contour image 104, since there is no contour in the region 110a, the answer to step S3 is negative, and the contour corrector 62 performs a process of not correcting the contour of the grayscale image 100 (hereinafter referred to as "process B").

Figure 7A:
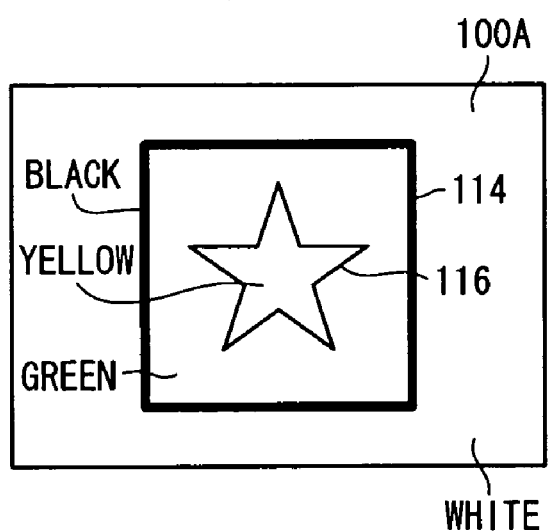
FIG. 7A is a diagram showing a grayscale image whose contour has been corrected by the process according to the first exemplary embodiment.

FIG. 7A shows a grayscale image 100A whose contour has been corrected by the process A. As shown in FIG. 7A, the grayscale image 100A contains an emphasized rectangular contour 114 compared with the rectangular contour in the original grayscale image 100 and a star-shaped contour 116 which remains the same as the star-shaped contour in the original grayscale image 100. The grayscale image 100A processed by the above contour correcting process provides information representing the emphasized boundary of the subject 12.

Figure 7B:
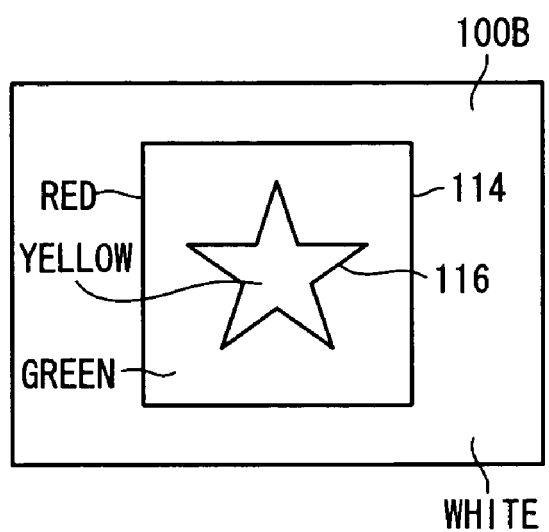
FIG. 7B is a diagram showing a grayscale image whose contour has been corrected by another process.

When there is a contour in the region 110b on the distance contour image 106 which corresponds to the contour region 108b on the grayscale contour image 104, the rectangular contour 114 may be drawn in another color as indicated by a grayscale image 100B corrected according to the process A, as shown in FIG. 7B. In the grayscale image 100B, the star-shaped area and the rectangular area are drawn in the original colors of yellow and green, respectively, and the rectangular contour is drawn in the appealing color of red.

According to the first exemplary embodiment, as described above, the contour correcting process is performed on the contour 114 (see FIGS. 7A and 7B) of the grayscale image 100 where the grayscale contour image 104 (FIG. 6B) extracted from the grayscale image 100 (FIG. 6A) and the distance contour image 106 (FIG. 6D) extracted from the distance image 102 (FIG. 6C) agree with each other in contour, and the contour-corrected grayscale image 100A or 100B is generated. It is thus possible to highlight or emphasize the boundary of the subject 12 (see FIG. 5) on the grayscale image 100A or 100B. Accordingly, a contour correcting process, which is different from the ordinary contour correcting process, can be carried out on the boundary of the subject 12. The contour correcting process according to the present exemplary embodiment is effectively applicable to the art of recognition of objects, for example.

Figure 8:
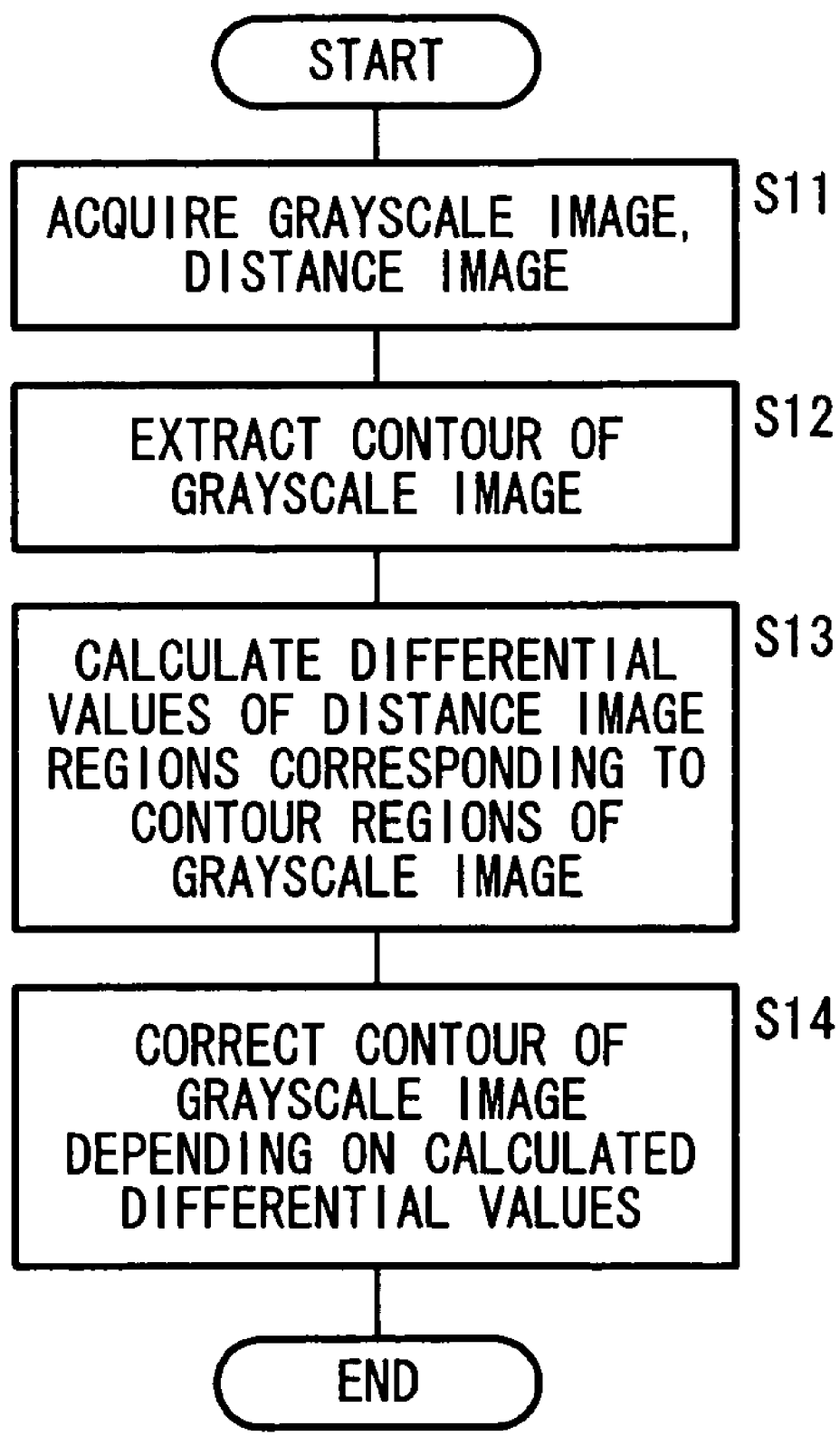
FIG. 8 is a flowchart of an operation sequence of a process according to a second exemplary embodiment of the present invention.
Figure 9:
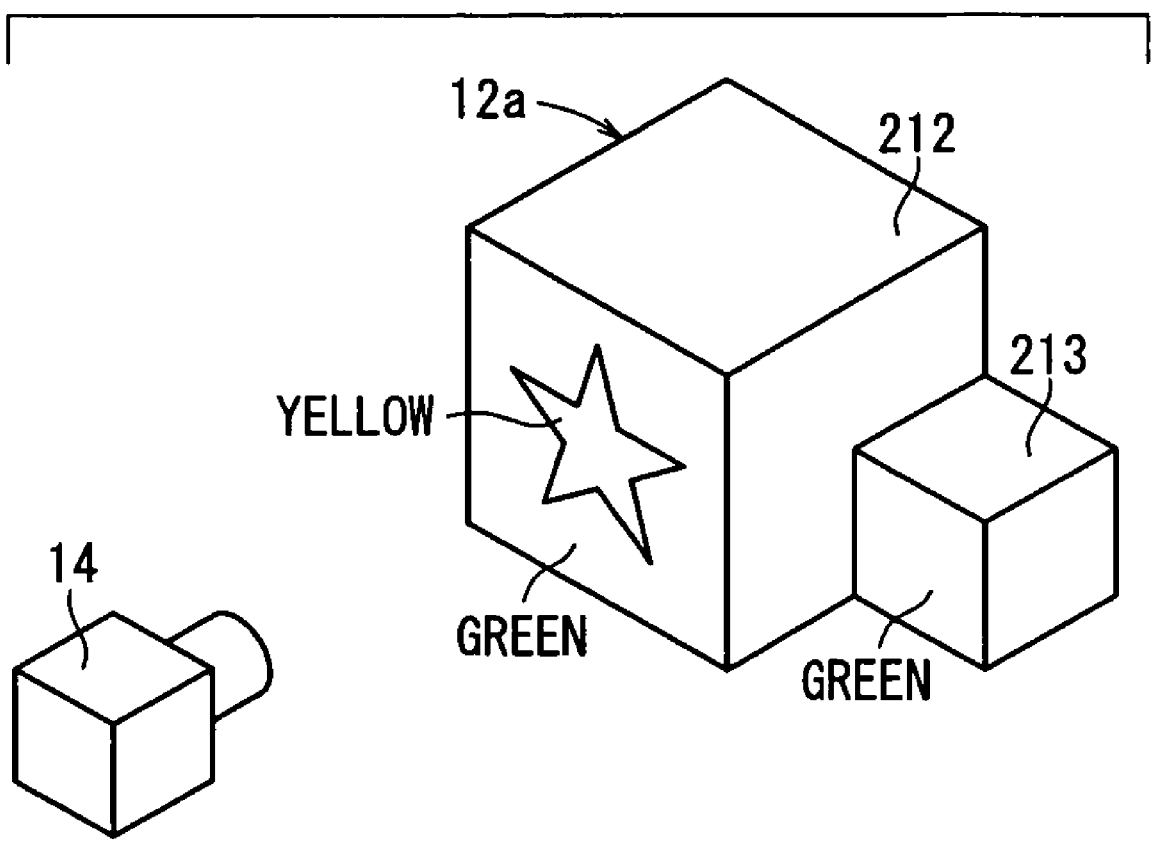
FIG. 9 is a view showing a subject to be imaged in the process according to the second exemplary embodiment.

Second exemplary embodiment (a process of expressing the degree (extent) of a contour correcting process by using a function of differential values of distance value differences of a distance image):

FIG. 8 is a flowchart of an operation sequence of a process according to a second exemplary embodiment of the present invention. According to the second exemplary embodiment, as shown in FIG. 9, a subject 12a which faces the image capturing unit 14 head-on comprises a box 212 in the form of a green rectangular parallelepiped with a yellow star-shaped pattern painted on its front facet and a box 213 in the form of a smaller green rectangular parallelepiped which is located farther than the box 212 from the image capturing unit 14.

In step S11, as with step S1 shown in FIG. 4, the grayscale contour image generator 54 acquires a grayscale image of the subject 12a through the grayscale image capturing unit 14b and the grayscale image generator 48, and the distance contour image generator 52 acquires a distance image of the subject 12a through the distance image capturing unit 14a and the distance image generator 46.

Figure 10A:
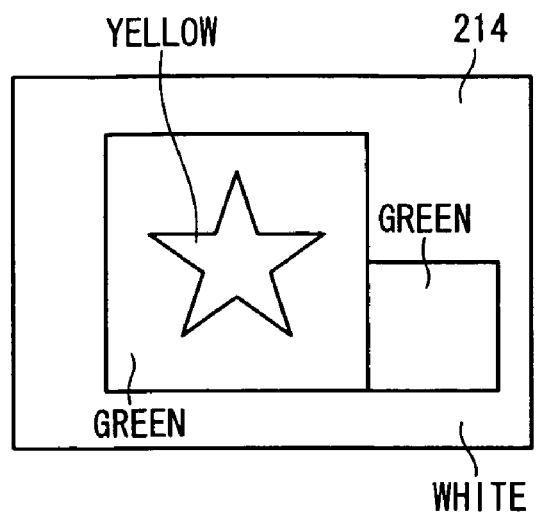
FIG. 10A is a diagram showing a grayscale image.
Figure 10B:
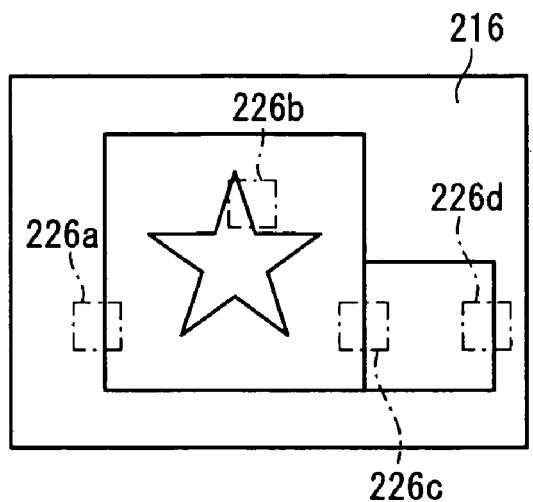
FIG. 10B is a diagram showing a grayscale contour image.
Figure 10C:
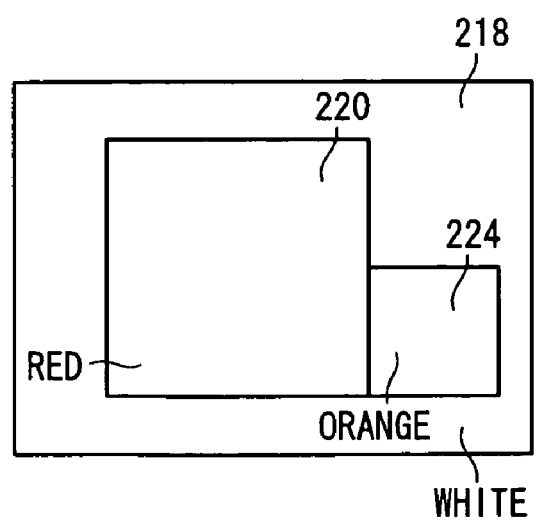
FIG. 10C is a diagram showing a distance image.

FIG. 10A shows an acquired grayscale image 214 of the subject 12a. FIG. 10C shows an acquired distance image 218. The distance image 218 has different display colors depending on the distance. Specifically, the distance image 218 contains a red box 220, an orange box 224, and white background.

In step S12, the grayscale contour image generator 54 extracts a contour from the grayscale image 214. FIG. 10B shows an extracted grayscale contour image 216. The grayscale contour image 216 shown in FIG. 10B contains a large rectangular shape, a star shape, and a small rectangular shape which are extracted as contours from the grayscale image 214 shown in FIG. 10A.

In step S13, the distance image differential value calculator 58a calculates differential values di (di=distance value difference/positional difference=$\Delta d/\Delta p$, e.g., the distance value difference $\Delta d$ represents the difference between the distance values of adjacent pixels, and the positional difference $\Delta p$ represents the difference between the pixel position coordinate values of adjacent pixels) of regions on the distance image 218 whose coordinate positions correspond to those of contour regions 226a, 226b, 226c, 226d, etc. which contain portions of the contours of the grayscale contour image 216. The positional difference $\Delta p$ represents a small value which can freely be selected.

Figure 10D:
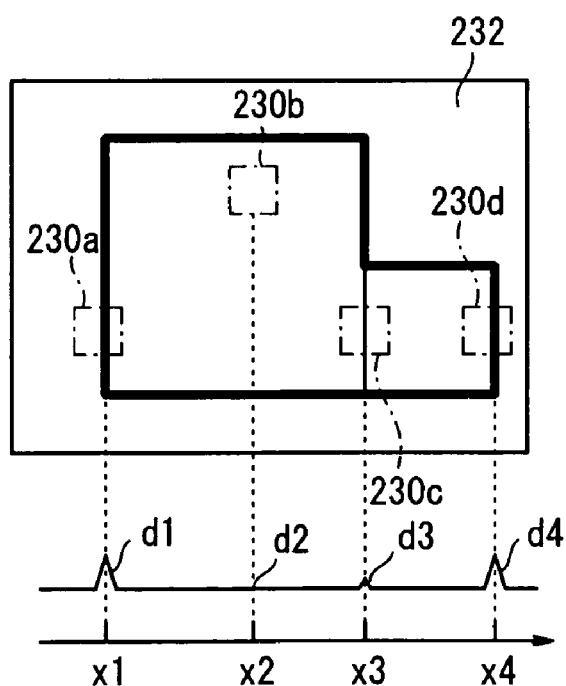
FIG. 10D is a diagram showing a distance differential image.

FIG. 10D shows a distance differential image 232 wherein the differential values (distance image differential values) di of the distance image 218 are represented by the thickness of the contours.

In FIGS. 10B, 10D, the distance image differential value d2 in a region 230b at a position x2 corresponding to the contour region 226b is d2=0, and the distance image differential value d3 in a region 230c at a position x3 corresponding to the contour region 226c is smaller than the distance image differential values d1, d4 at positions x1, x4 corresponding to the contour regions 226a, 226c. Actually, since the distance image differential value d1 in the region 230a has a greater distance difference with the background than the distance image differential value d4 in the region 230d (see FIG. 9), the distance image differential value d1 is slightly greater than the distance image differential value d4 (d1>d4>d3>d2).

Then, distance image differential value calculator 58a calculates distance image differential values di in the regions on the distance image 218 whose coordinate positions correspond to all the contour regions (the contour-containing region) of the grayscale contour image 216.

In step S14, the contour corrector 62 performs a contour correcting process on the grayscale image 214 (see FIG. 10A), depending on the distance image differential values di calculated with respect to the distance image 218 in step S13.

The contour corrector 62 may perform any one of the following two contour correcting processes, for example.

Figure 11:
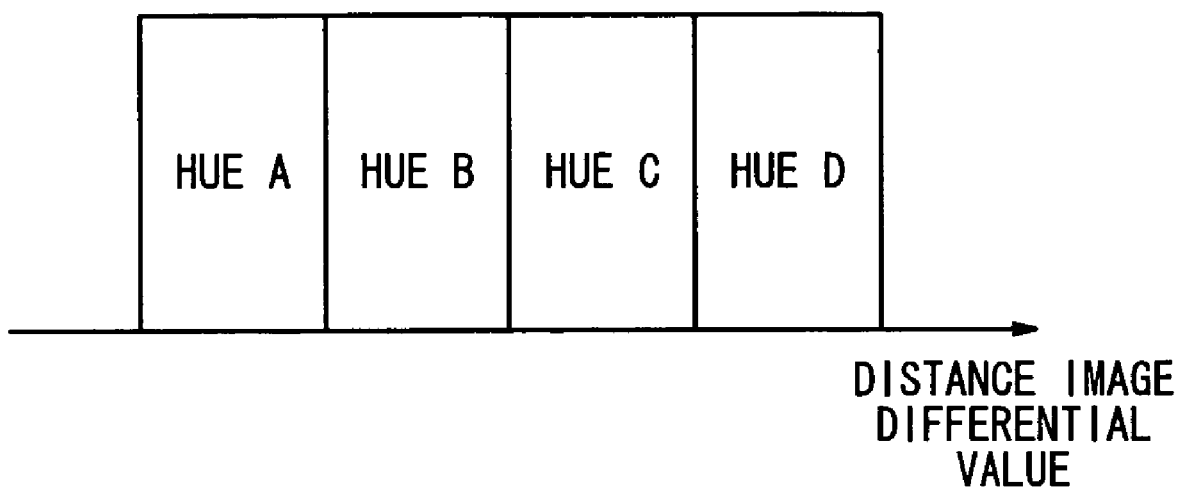
FIG. 11 is a diagram showing a differential hue selection table.

According to one of the two contour correcting processes, a result is selected depending on the calculated distance image differential value di. For example, a hue selection table for selecting hues A through D depending on the distance image differential value di as shown in FIG. 11 is used, and one of the hues A through D is selected from the differential hue selection table for the contours of the grayscale image 214 depending on the distance image differential value di.

According to the other contour correcting process, the calculated distance image differential value di is put into a function formula, and the result of the calculated function formula is reflected in the grayscale image 214.

Figure 12:
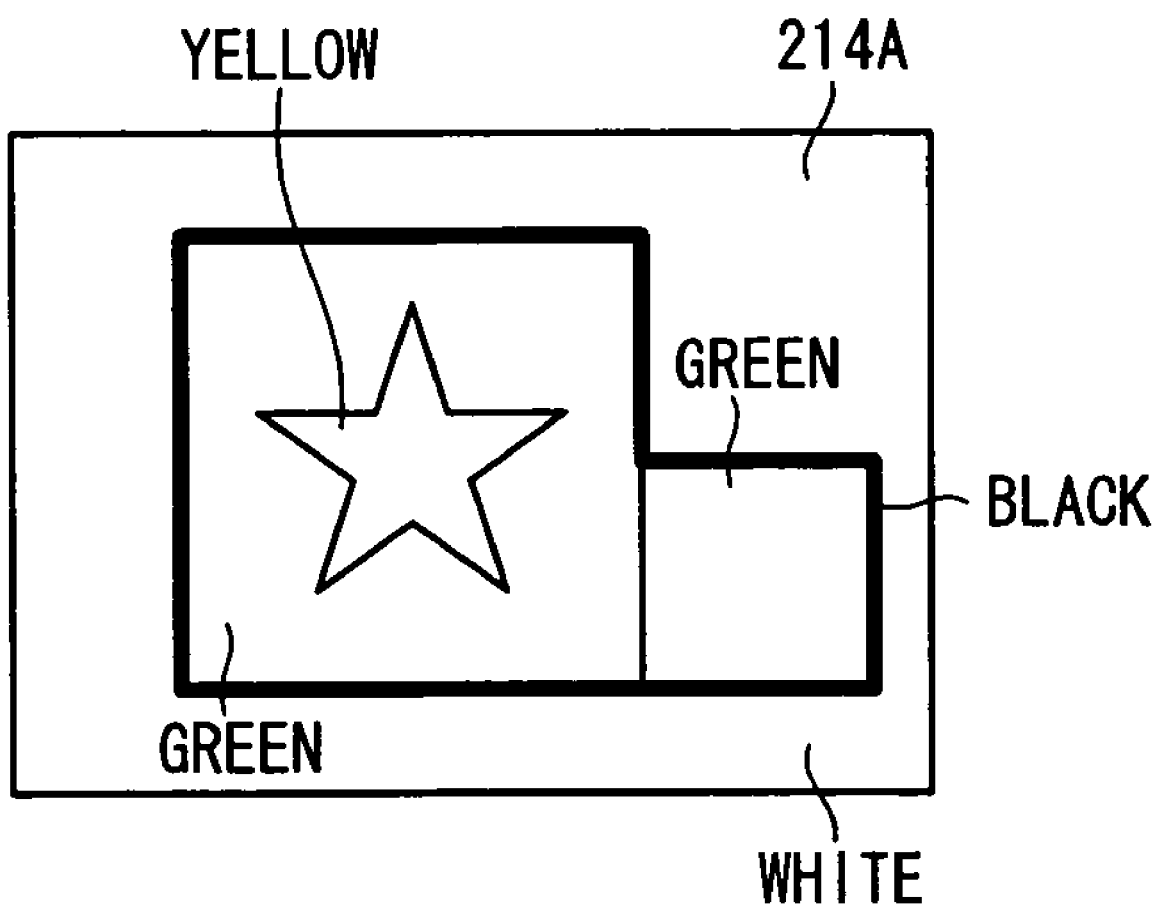
FIG. 12 is a diagram showing a grayscale image whose contour has been corrected by a process according to a second exemplary embodiment of the present invention.
Figure 13:
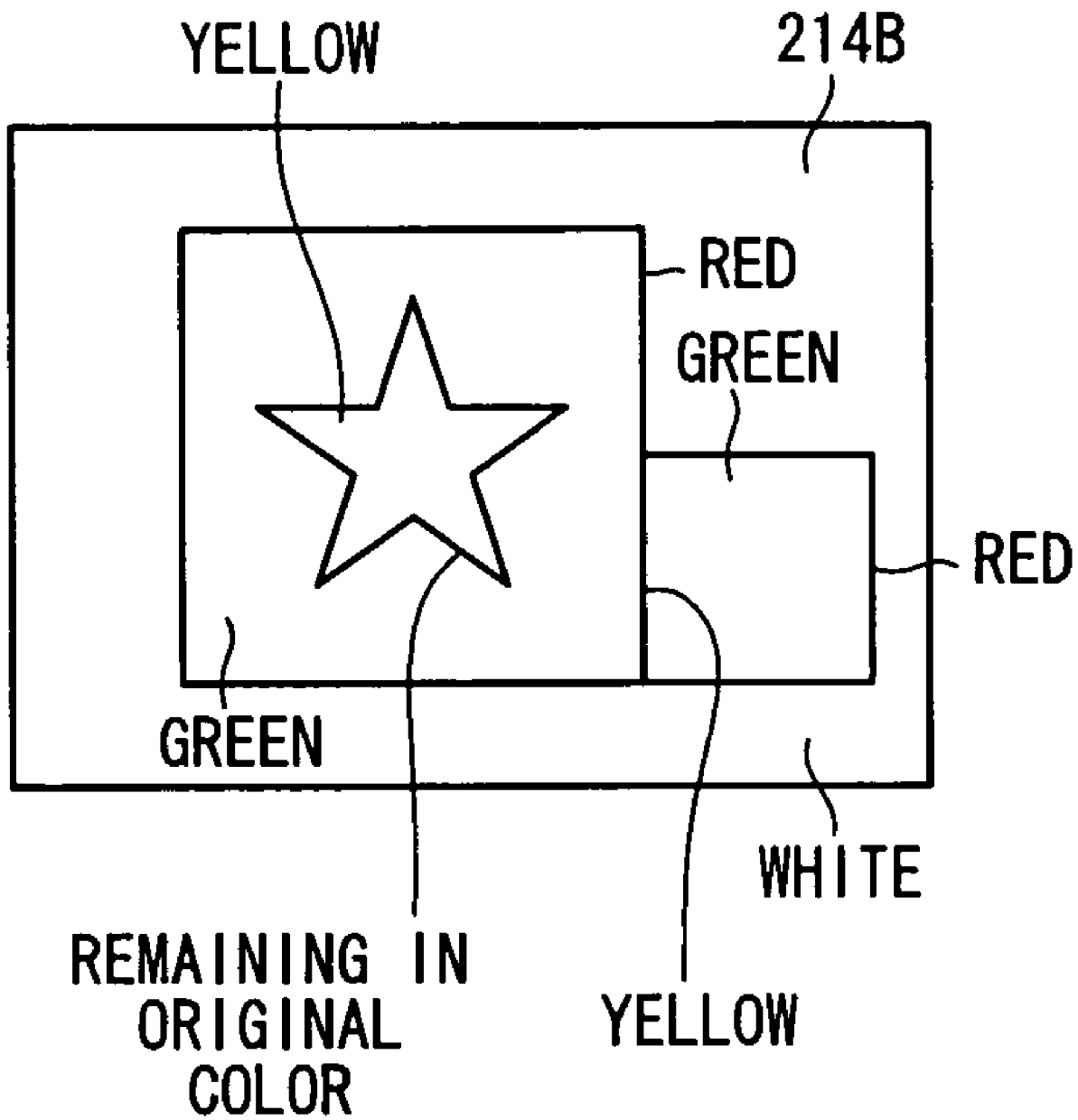
FIG. 13 is a diagram showing a grayscale image whose contour has been corrected by another process according to the second exemplary embodiment of the present invention.

FIG. 12 shows a grayscale image 214A whose contour has been corrected by reflecting the calculated distance image differential value di in the grayscale image 214 shown in FIG. 10A. In FIG. 12, the contour of the grayscale image 214 is emphasized depending on the magnitude of the distance image differential value di of the distance image 218, i.e., the contour of the grayscale image 214 is made thicker if the distance image differential value di is greater than d3, and the contour of the grayscale image 214 remains unchanged if the distance image differential value di is smaller than a certain value, or if the distance image differential value di is smaller than d3. This process is expressed by the following equation with respect to each pixel of the grayscale image 214:

Contour of processed grayscale image=contour of grayscale image to be processed+constant×distance image differential value FIG. 13 shows another grayscale image 214B whose contours have been corrected by reflecting the calculated distance image differential value di in the grayscale image 214.

In the corrected grayscale image 214B shown in FIG. 13, the color of the contours of the grayscale image 214 is changed depending on the distance image differential value di of the distance image 218. This process is expressed by the following equation:

Hue of contour of processed grayscale image=constant×distance image differential value A contour with a large distance image differential value di (an outermost contour) is colored in red, a contour with a small distance image differential value di (the boundary between the large and small rectangular shapes) is colored in yellow, and a contour (star-shaped) where the distance image differential value di is nil remains in the original color.

This process is capable of presenting information representing a smoothly emphasized boundary to the user. The function equations that can be used are not limited to the above two equations.

In the above example, the contours are corrected depending on the distance image differential value di. However, the contours can similarly be corrected by having the distance image distance value difference calculator 58b calculate distance value differences Δd between regions on the distance image 218 whose coordinate positions correspond to those of contour regions (contour-containing regions) 226a, 226b, 226c, 226d, etc. which contain portions of the contours of the grayscale contour image 216.

According to the second exemplary embodiment, as described above, the distance image differential values di representing differentials of contours in the regions (regions at the same positions as the regions 230a through 230d on the distance differential image 232) on the distance image 218 whose coordinate positions correspond to those of the contour regions (regions containing portions of the contours) 226a through 226d on the grayscale contour image 216, or distance value differences Δd between pixels making up the contours in the regions on the distance image 218, are calculated, and the contours of the grayscale image 214 are corrected depending on the calculated distance image differential values di or distance value differences Δd. Accordingly, appropriate information can be added to object boundaries, for example, and continuous information can be given. The contour correcting process according to the present exemplary embodiment is effectively applicable to the art of recognition of objects, for example.

Figure 14:
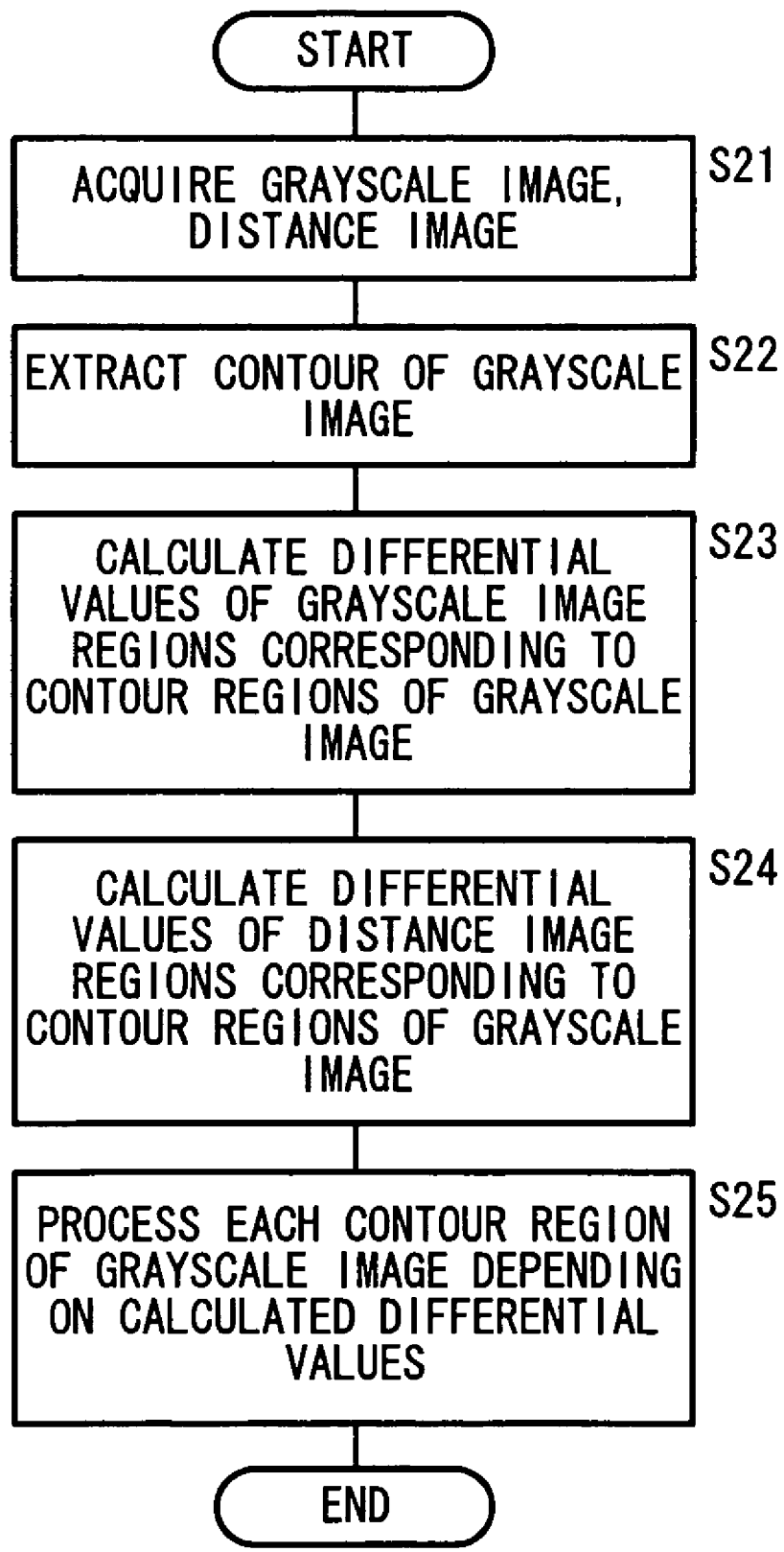
FIG. 14 is a flowchart of an operation sequence of a process according to a third exemplary embodiment of the present invention.

Third exemplary embodiment (a process of expressing the degree (extent) of a contour correcting process by using a function of differential values of distance and grayscale images or differences therebetween (distance value differences or gradation value differences):

FIG. 14 is a flowchart of an operation sequence of a process according to a third exemplary embodiment of the present invention. The third exemplary embodiment is different from the second exemplary embodiment in that not only the distance image differential values di of the distance image 218 (FIG. 10C), but also grayscale image differential values dj of the grayscale image 214, are reflected in the correction of the contours of the grayscale image 214 (FIG. 10A).

Steps S21, S22, S24 are identical to the above-mentioned steps S11, S12, S13, respectively.

In step S23, the grayscale image differential value calculator 60a calculates grayscale image differential values dj (dj=gradation value difference/positional difference=Δg/Δp, e.g., the gradation value difference Δg represents the difference between the gradation values of adjacent ones of the pixels of the grayscale image 214, and the positional difference Δp represents the difference between the pixel positions of adjacent pixels) of regions on the grayscale image 214 which correspond to the contour regions 226a through 226d, etc. which contain portions of the contours of the grayscale contour image 216 shown in FIG. 10B.

FIGS. 15A through 15E show the grayscale image differential values dj of the regions on the grayscale image 214 which correspond to the contour regions 226a through 226d on the grayscale image 214 (the grayscale contour image 216), and the distance image differential values di of the regions on the distance image 218 which correspond to the contour regions 226a through 226d, etc. on the grayscale image 214 (the grayscale contour image 216).

FIG. 15A schematically shows a composite image 250 representing a combination of the grayscale image 214, the grayscale contour image 216, and the distance image 218.

FIG. 15B shows the grayscale image differential values dj of the grayscale image 214 at the positions on a dot-and-dash line 252 of the composite image 250. The grayscale image differential value dj is greatest at positions x2, x3 where the dot-and-dash line 252 crosses the yellow start shape. The grayscale image differential value dj is second greatest at positions x1, x5 where outermost contours of the green box of the subject 12 cross the background. The grayscale image differential value dj is smallest at a position x4 where the green boxes cross each other. The grayscale image differential value dj is nil at other positions (where the gradation value difference between adjacent pixels is nil).

FIG. 15C shows the distance image differential values di of the distance image 218 at the positions on the dot-and-dash line 252 of the composite image 250, generated by the distance image differential value calculator 58a in step S24. As described above, the distance image differential value di is greatest at the positions x1, x5 where the outermost contours of the green box of the subject 12 contact the background. The distance image differential value di is second greatest at the position x4 where the green boxes contact each other. The distance image differential value di is nil at other positions (where the distance value difference between adjacent pixels is nil).

In step S25, contour corrector 62 performs a contour correcting process on the contours of the grayscale image 214 using the grayscale image differential values dj of the grayscale image 214 and the distance image differential values di of the distance image 218, which are calculated respectively in steps S23, S24.

The contour corrector 62 may perform any one of the following two contour correcting processes, for example.

According to one of the two contour correcting processes, a result is selected depending on the calculated values. This contour correcting process is illustrated in FIG. 16. According to the contour correcting process illustrated in FIG. 16, contour emphasis levels A through I in the grayscale image 214 are selected based on the distance image differential values di and the grayscale image differential values dj. In the contour correcting process illustrated in FIG. 16, the contour emphasis levels A through I may be replaced with hues A' through I'.

According to the other contour correcting process, the calculated results are put into a function formula, and the result of the calculated function formula is reflected in the grayscale image 214. Function formulas according to the following examples 1, 2 may be used.

EXAMPLE 1

Contour of processed grayscale image=contour of grayscale image to be processed+constant×(constant×distance image differential value×grayscale image differential value)$^{1/2}$

EXAMPLE 2 contour of processed grayscale image=contour of grayscale image to be processed+constant×(constant×distance image differential value×grayscale image differential value)/2

According to the function formulas of the examples 1, 2, the contours of the grayscale image 214 are processed by differential values (see FIG. 15D) {average value=(dj+di)/2] produced by generally averaging the grayscale image 214 using the grayscale image differential values dj of the grayscale image 214 and the distance image differential values di of the distance image 218.

According to the third exemplary embodiment, the contour correcting process is capable of correcting the contours so as to make them look like actually viewed contours while the boundary of the grayscale image 214 is more emphasized than with the second exemplary embodiment.

While the contour correcting process is carried out based on both the differential values dj, di of the grayscale image 214 and the distance image 218 in the above description of the third exemplary embodiment, the contour correcting process may be carried out based on the differences (gradation value differences and distance value differences) between the grayscale image 214 and the distance image 218, or may be carried out based on the differences (gradation value differences or distance value differences) and the differential values (grayscale image differential values dj or the distance image differential values di).

In this case, the grayscale image gradation value difference calculator 60b calculates gradation value differences Δg (e.g., the difference between the gradation values of adjacent pixels) between regions on the grayscale image 214 which correspond to the contour regions (contour-containing regions) 226a, 226b, 226c, 226d, etc. which contain portions of the contours of the grayscale contour image 216 shown FIG. 10B.

According to the third exemplary embodiment, as described above, the distance image 218 whose pixels include distance values and the grayscale image 214 whose pixels include gradation values are captured from the same subject 12a, and the grayscale contour image 216 representing the contours extracted from the grayscale image 214 is generated. Then, the grayscale image differential values dj or the gradation value differences Δg in the regions (the contour regions 226a through 226d) including portions of the contours of the grayscale image 214 are calculated, and the distance image differential values di or the distance value differences Δd in the regions on the distance image 218 which correspond to the regions including portions of the contours of the grayscale contour image 216 are calculated. The contours of the grayscale image 214 are corrected based on the grayscale image differential values dj or the gradation value differences Δg which have been calculated on the grayscale image 214 and the distance image differential values di or the distance value differences Δd which have been calculated on the distance image 218. Consequently, boundary information of the subject 12a can be added in a natural fashion to the contours of the grayscale image 214. Since the information of the grayscale image 214 remains unremoved, a natural three-dimensional effect of the grayscale image 214 is achieved. The subject referred to above covers a group of subjects. For example, in FIG. 9, the two boxes 212, 213 are combined into the single subject 12a. Two boxes that are placed in spaced positions may also be regarded as one subject when they are viewed overlappingly, e.g., along the optical axis of the image capturing unit 14.

According to the first through third exemplary embodiments, the contours of the grayscale images 100, 214 can be corrected depending on the application of the present invention.

The operation sequences shown in the above flowcharts may be available as a program which can be read and executed by a computer.

In addition, the operation sequences may be available as a recording medium storing such program.

Although certain preferred embodiments of the present invention have been shown and described in detail, it should be understood that various changes and modifications may be made therein without departing from the scope of the appended claims.

What is claimed is:

1. A method of correcting a contour of a grayscale image based on an image processing process carried out by a computer, said method comprising:
generating a distance contour image representing a contour extracted from a distance image whose pixels include distance values and a grayscale contour image representing a contour extracted from a grayscale image whose pixels include gradation values, from a subject;
determining whether there is a contour in a region on said distance contour image whose coordinate position corresponds to that of a region which includes a portion of the contour of said grayscale contour image; and
correcting the contour of said grayscale image if it is judged that there is said contour in said region,
wherein said correcting the contour of said grayscale image corrects the contour of said grayscale image by placing a calculated distance image differential value into a function formula, and applying a result of the function formula to the grayscale image, and
wherein said function formula is expressed as:

contour of processed grayscale image=contour of grayscale image to be processed+constant×(constant×distance image differential value×grayscale image differential value)$^{1/2}$.

2. A method according to claim 1, wherein said correcting the contour of said grayscale image comprises using the contour of said grayscale contour image.

3. A method according to claim 1, further comprising:
calculating a differential value of the distance image by referring to the grayscale contour image; and
calculating a distance value difference of the distance image by referring to the grayscale contour image.

4. A method according to claim 3, wherein said correcting the contour of said grayscale image comprises using the differential value of the distance image and the distance value difference of the distance image to correct the contour of said grayscale image.

5. A method according to claim 4, further comprising:
calculating a differential value of the grayscale image; and
calculating a gradation value difference of the grayscale image by referring to the grayscale contour image.

6. A method according to claim 5, wherein said correcting the contour of said grayscale image further comprises using the differential value of the grayscale image and the gradation value difference of the grayscale image to correct the contour of said grayscale image.

7. A method according to claim 1, wherein said determining whether there is the contour in said region comprises using the distance contour image and the grayscale contour image.

8. An apparatus for correcting a contour of a grayscale image, said apparatus comprising:
- a contour image generator for generating a distance contour image representing a contour extracted from a distance image whose pixels include distance values and a grayscale contour image representing a contour extracted from a grayscale image whose pixels include gradation values, from a subject;
- a contour existence/nonexistence determining unit for determining whether there is a contour in a region on said distance contour image whose coordinate position corresponds to that of a region which includes a portion of the contour of said grayscale contour image; and
- a contour corrector for correcting the contour of said grayscale image if it is judged that there is said contour in said region,
- wherein said contour corrector corrects the contour of said grayscale image by placing a calculated distance image differential value into a function formula, and applying a result of the function formula to the grayscale image, and
- wherein said function formula is expressed as:

contour of processed grayscale image=contour of grayscale image to be processed+constant×(constant×distance image differential value ×grayscale image differential value)$^{1/2}$.

9. A method of correcting a contour of a grayscale image based on an image processing process carried out by a computer, said method comprising:
- generating a distance contour image representing a contour extracted from a distance image whose pixels include distance values and a grayscale contour image representing a contour extracted from a grayscale image whose pixels include gradation values, from a subject;
- determining whether there is a contour in a region on said distance contour image whose coordinate position corresponds to that of a region which includes a portion of the contour of said grayscale contour image; and
- correcting the contour of said grayscale image if it is judged that there is said contour in said region,
- wherein said correcting the contour of said grayscale image corrects the contour of said grayscale image by placing a calculated distance image differential value into a function formula, and applying a result of the function formula to the grayscale image, and
- wherein said function formula is expressed as:

contour of processed grayscale image=contour of grayscale image to be processed+constant×(constant×distance image differential value×grayscale image differential value)/2.

10. A method according to claim 9, wherein said correcting the contour of said grayscale image comprises using the contour of said grayscale contour image.

11. A method according to claim 9, further comprising:
- calculating a differential value of the distance image by referring to the grayscale contour image; and
- calculating a distance value difference of the distance image by referring to the grayscale contour image.

12. A method according to claim 11, wherein said correcting the contour of said grayscale image comprises using the differential value of the distance image and the distance value difference of the distance image to correct the contour of said grayscale image.

13. A method according to claim 12, further comprising:
- calculating a differential value of the grayscale image; and
- calculating a gradation value difference of the grayscale image by referring to the grayscale contour image.

14. A method according to claim 13, wherein said correcting the contour of said grayscale image further comprises using the differential value of the grayscale image and the gradation value difference of the grayscale image to correct the contour of said grayscale image.

15. A method according to claim 9, wherein said determining whether there is the contour in said region comprises using the distance contour image and the grayscale contour image.

16. An apparatus for correcting a contour of a grayscale image, said apparatus comprising:
- a contour image generator for generating a distance contour image representing a contour extracted from a distance image whose pixels include distance values and a grayscale contour image representing a contour extracted from a grayscale image whose pixels include gradation values, from a subject;
- a contour existence/nonexistence determining unit for determining whether there is a contour in a region on said distance contour image whose coordinate position corresponds to that of a region which includes a portion of the contour of said grayscale contour image; and
- a contour corrector for correcting the contour of said grayscale image if it is judged that there is said contour in said region,
- wherein said contour corrector corrects the contour of said grayscale image by placing a calculated distance image differential value into a function formula, and applying a result of the function formula to the grayscale image, and
- wherein said function formula is expressed as:

contour of processed grayscale image=contour of grayscale image to be processed+constant×(constant×distance image differential value×grayscale image differential value)/2.

17. A method of correcting a contour of a grayscale image based on an image processing process carried out by a computer, said method comprising:
- generating a distance contour image representing a contour extracted from a distance image whose pixels include distance values and a grayscale contour image representing a contour extracted from a grayscale image whose pixels include gradation values, from a subject;
- determining whether there is a contour in a region on said distance contour image whose coordinate position corresponds to that of a region which includes a portion of the contour of said grayscale contour image; and
- correcting the contour of said grayscale image if it is judged that there is said contour in said region,
- wherein said correcting the contour of said grayscale image corrects the contour of said grayscale image by placing a calculated distance image differential value into a function formula, and applying a result of the function formula to the grayscale image, and
- said function formula is expressed as:

contour of processed grayscale image=contour of grayscale image to be processed+constant×distance image differential value.

18. A method according to claim 17, wherein said correcting the contour of said grayscale image comprises using the contour of said grayscale contour image.

19. A method according to claim 17, further comprising:
- calculating a differential value of the distance image by referring to the grayscale contour image; and
- calculating a distance value difference of the distance image by referring to the grayscale contour image.

20. A method according to claim 19, wherein said correcting the contour of said grayscale image comprises using the differential value of the distance image and the distance value difference of the distance image to correct the contour of said grayscale image.

21. A method according to claim 20, further comprising:
calculating a differential value of the grayscale image; and
calculating a gradation value difference of the grayscale image by referring to the grayscale contour image.

22. A method according to claim 21, wherein said correcting the contour of said grayscale image further comprises using the differential value of the grayscale image and the gradation value difference of the grayscale image to correct the contour of said grayscale image.

23. A method according to claim 17, wherein said determining whether there is the contour in said region comprises using the distance contour image and the grayscale contour image.

24. An apparatus for correcting a contour of a grayscale image, said apparatus comprising:
a contour image generator for generating a distance contour image representing a contour extracted from a distance image whose pixels include distance values and a grayscale contour image representing a contour extracted from a grayscale image whose pixels include gradation values, from a subject;
a contour existence/nonexistence determining unit for determining whether there is a contour in a region on said distance contour image whose coordinate position corresponds to that of a region which includes a portion of the contour of said grayscale contour image; and
a contour corrector for correcting the contour of said grayscale image if it is judged that there is said contour in said region,
wherein said contour corrector corrects the contour of said grayscale image by placing a calculated distance image differential value into a function formula, and applying a result of the function formula to the grayscale image, and
wherein said function formula is expressed as:

contour of processed grayscale image=contour of grayscale image to be processed+constant×distance image differential value.

25. A method of correcting a contour of a grayscale image based on an image processing process carried out by a computer, said method comprising:
generating a distance contour image representing a contour extracted from a distance image whose pixels include distance values and a grayscale contour image representing a contour extracted from a grayscale image whose pixels include gradation values, from a subject;
determining whether there is a contour in a region on said distance contour image whose coordinate position corresponds to that of a region which includes a portion of the contour of said grayscale contour image; and
correcting the contour of said grayscale image if it is judged that there is said contour in said region,
wherein said correcting the contour of said grayscale image corrects the contour of said grayscale image by placing a calculated distance image differential value into a function formula, and applying a result of the function formula to the grayscale image, and
wherein a hue of contour of a processed grayscale image is changed depending on a function formula expressed as:

hue of contour of processed grayscale image=constant×distance image differential value.

26. A method according to claim 25, wherein said correcting the contour of said grayscale image comprises using the contour of said grayscale contour image.

27. A method according to claim 25, further comprising:
calculating a differential value of the distance image by referring to the grayscale contour image; and
calculating a distance value difference of the distance image by referring to the grayscale contour image.

28. A method according to claim 27, wherein said correcting the contour of said grayscale image comprises using the differential value of the distance image and the distance value difference of the distance image to correct the contour of said grayscale image.

29. A method according to claim 28, further comprising:
calculating a differential value of the grayscale image; and
calculating a gradation value difference of the grayscale image by referring to the grayscale contour image.

30. A method according to claim 29, wherein said correcting the contour of said grayscale image further comprises using the differential value of the grayscale image and the gradation value difference of the grayscale image to correct the contour of said grayscale image.

31. A method according to claim 25, wherein said determining whether there is the contour in said region comprises using the distance contour image and the grayscale contour image.

32. An apparatus for correcting a contour of a grayscale image, said apparatus comprising:
a contour image generator for generating a distance contour image representing a contour extracted from a distance image whose pixels include distance values and a grayscale contour image representing a contour extracted from a grayscale image whose pixels include gradation values, from a subject;
a contour existence/nonexistence determining unit for determining whether there is a contour in a region on said distance contour image whose coordinate position corresponds to that of a region which includes a portion of the contour of said grayscale contour image; and
a contour corrector for correcting the contour of said grayscale image if it is judged that there is said contour in said region,
wherein said contour corrector corrects the contour of said grayscale image by placing a calculated distance image differential value into a function formula, and applying a result of the function formula to the grayscale image, and
wherein a hue of contour of a processed grayscale image is changed depending on a function formula expressed as:

hue of contour of processed grayscale image=constant×distance image differential value.

33. A method of correcting a contour of a grayscale image based on an image processing process carried out by a computer, said method comprising:
generating a distance contour image representing a contour extracted from a distance image whose pixels include distance values and a grayscale contour image representing a contour extracted from a grayscale image whose pixels include gradation values, from a subject;
determining whether there is a contour in a region on said distance contour image whose coordinate position corresponds to that of a region which includes a portion of the contour of said grayscale contour image; and
correcting the contour of said grayscale image if it is judged that there is said contour in said region, wherein said correcting the contour of said grayscale image corrects the contour of said grayscale image by selecting one of hues from a differential hue selection table for contours of the grayscale image depending on a distance image differential value.

34. A method according to claim 33, wherein said correcting the contour of said grayscale image comprises using the contour of said grayscale contour image.

35. A method according to claim 33, further comprising:
calculating a differential value of the distance image by referring to the grayscale contour image; and
calculating the distance value difference in the distance image by referring to the grayscale contour image.

36. A method according to claim 35, wherein said correcting the contour of said grayscale image comprises using the differential value of the distance image and the distance value difference of the distance image to correct the contour of said grayscale image.

37. A method according to claim 36, further comprising:
calculating a differential value of the grayscale image; and
calculating a gradation value difference of the grayscale image by referring to the grayscale contour image.

38. A method according to claim 37, wherein said correcting the contour of said grayscale image further comprises using the differential value of the grayscale image and the gradation value difference of the grayscale image to correct the contour of said grayscale image.

39. A method according to claim 33, wherein said determining whether there is the contour in said region comprises using the distance contour image and the grayscale contour image.

40. An apparatus for correcting a contour of a grayscale image, said apparatus comprising:
a contour image generator for generating a distance contour image representing a contour extracted from a distance image whose pixels include distance values and a grayscale contour image representing a contour extracted from a grayscale image whose pixels include gradation values, from a subject;
a contour existence/nonexistence determining unit for determining whether there is a contour in a region on said distance contour image whose coordinate position corresponds to that of a region which includes a portion of the contour of said grayscale contour image; and
a contour corrector for correcting the contour of said grayscale image if it is judged that there is said contour in said region,
wherein said contour corrector corrects the contour of said grayscale image by selecting one of hues from a differential hue selection table for contours of the grayscale image depending on a distance image differential value.

* * * * *